(12) United States Patent
Cui et al.

(10) Patent No.: US 11,820,244 B2
(45) Date of Patent: Nov. 21, 2023

(54) ENERGY CONVERSION APPARATUS, POWER SYSTEM, AND VEHICLE

(71) Applicant: Huawei Digital Power Technologies Co., Ltd., Shenzhen (CN)

(72) Inventors: Zhaoxue Cui, Dongguan (CN); Wei Zhang, Dongguan (CN); Weiping Liu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 61 days.

(21) Appl. No.: 17/710,691

(22) Filed: Mar. 31, 2022

(65) Prior Publication Data
US 2022/0219554 A1 Jul. 14, 2022

(30) Foreign Application Priority Data
Mar. 31, 2021 (CN) .......................... 202110354416.3

(51) Int. Cl.
*B60L 53/22* (2019.01)
*B60L 53/24* (2019.01)

(52) U.S. Cl.
CPC ............... *B60L 53/22* (2019.02); *B60L 53/24* (2019.02); *B60L 2210/10* (2013.01); *B60L 2210/20* (2013.01); *B60L 2210/30* (2013.01)

(58) Field of Classification Search
CPC ...... B60L 53/22; B60L 53/24; B60L 2210/10; B60L 2210/20; B60L 2210/30; B60L 53/11; B60L 53/10; B60L 53/14
(Continued)

(56) References Cited

U.S. PATENT DOCUMENTS

| | | | | |
|---|---|---|---|---|
| 11,642,981 B1 * | 5/2023 | Rogers | .................... | B60L 53/22 320/104 |
| 2014/0002023 A1 * | 1/2014 | Ichikawa | ................ | B60L 53/22 320/109 |

(Continued)

FOREIGN PATENT DOCUMENTS

| CN | 104553809 A | 4/2015 |
|---|---|---|
| CN | 111434513 A | 7/2020 |

(Continued)

OTHER PUBLICATIONS

Metwly et al., "A Review of Integrated On-Board EV Battery Chargers: Advanced Topologies, Recent Developments and Optimal Selection of FSCW Slot/Pole Combination," Digital Object Identifier 10.1109/ACCESS.2020.2992741, Total 27 pages, Institute of Electrical and Electronics Engineers, New York, New York (Date of current version May 19, 2020).

(Continued)

*Primary Examiner* — Paul Dinh
(74) *Attorney, Agent, or Firm* — Leydig, Voit & Mayer, Ltd.

(57) ABSTRACT

Embodiments of this application provide an energy conversion apparatus, a power system, and a vehicle. The energy conversion apparatus includes a first switch group, a second switch group, a third switch group, a three-phase converter, a motor coil, a bridge arm circuit, and a three-port converter. The energy conversion apparatus is integrated with functions of alternating-current charging, motor driving, and direct-current charging, and can be installed on an electric vehicle to improve vehicle integration, thereby simplifying a structural layout of the electric vehicle, and reducing costs and a volume of the electric vehicle.

15 Claims, 9 Drawing Sheets

(58) Field of Classification Search
USPC .......................................................... 320/104
See application file for complete search history.

(56) References Cited

U.S. PATENT DOCUMENTS

| 2014/0097792 A1 | 4/2014 | Su |
| 2014/0368131 A1 | 12/2014 | Katsumata et al. |
| 2016/0137149 A1 | 5/2016 | Kamachi |

FOREIGN PATENT DOCUMENTS

| CN | 111434514 A | 7/2020 |
| CN | 112224038 A | 1/2021 |
| CN | 112224050 A | 1/2021 |
| CN | 112389214 A | 2/2021 |
| EP | 2849308 A1 | 3/2015 |
| JP | 2020088873 A | 6/2020 |

OTHER PUBLICATIONS

Housheng,"Research On Key Control Techniques of Integrated Driving and Charging System of Electric Vehicle," Dissertation Submitted to Hebei University of Technology for The Doctor Degree of Control Theory and Control Engineering, Total 206 pages (Dec. 2016). With an English abstract.

* cited by examiner

ENERGY CONVERSION APPARATUS, POWER SYSTEM, AND VEHICLE

CROSS-REFERENCE TO RELATED APPLICATIONS

This application claims priority to Chinese Patent Application No. 202110354416.3, filed on Mar. 31, 2021, which is hereby incorporated by reference in its entirety.

TECHNICAL FIELD

Embodiments of this application relate to the field of energy technologies, and in particular, to an energy conversion apparatus, a power system, and a vehicle.

BACKGROUND

In the field of energy technologies, charging technologies of electric vehicles have always been an important research direction for researchers. An electric vehicle is not only provided with a charger and a battery related to charging, but is also equipped with various motors, such as a motor that drives the vehicle to travel and a motor in an air conditioner compressor. All these functional components of the electric vehicle are separately laid out, leading to a complex structural layout of the electric vehicle, low integration, a large volume, and high costs.

In order to improve vehicle integration, simplify the structure layout of the electric vehicle, and reduce the costs and volume of the electric vehicle, it is necessary to integrate a charging function and a motor driving function of the electric vehicle.

SUMMARY

Embodiments of this application provide an energy conversion apparatus, a power system, and a vehicle. The apparatus is integrated with a charging function and a motor driving function, and can be installed on an electric vehicle to improve vehicle integration, thereby simplifying a structural layout of the electric vehicle, and reducing costs and a volume of the electric vehicle.

According to a first aspect, an embodiment of this application provides an energy conversion apparatus, including a first switch group, a second switch group, a third switch group, a three-phase converter, a motor coil, a bridge arm circuit, and a three-port converter. A direct-current end of the three-phase converter is connected to an output end of a first battery through the first switch group. An alternating-current end of the three-phase converter is connected to the motor coil. The direct-current end of the three-phase converter is further connected to a direct-current end of the bridge arm circuit. An alternating-current end of the bridge arm circuit is connected to an alternating-current charging port through the third switch group. A bus end of the motor coil is connected to the alternating-current charging port through the third switch group. A first end of the three-port converter is connected to an input end of the first battery, a second end of the three-port converter is connected to the direct-current end of the bridge arm circuit, and a third end of the three-port converter is connected to a second battery. The input end of the first battery is connected to a direct-current charging port through the second switch group. The energy conversion apparatus can perform alternating-current charging when the first switch group is open, the second switch group is open, and the third switch group is closed; or perform motor driving when the first switch group is closed, the second switch group is open, and the third switch group is open; or perform direct-current charging when the first switch group is open, the second switch group is closed, and the third switch group is open. Therefore, the energy conversion apparatus is integrated with functions of alternating-current charging, motor driving, and direct-current charging, and can be installed on an electric vehicle to improve vehicle integration, thereby simplifying a structural layout of the electric vehicle, and reducing costs and a volume of the electric vehicle.

With reference to the first aspect, in an implementation of this embodiment of this application, the first switch group and the second switch group include a contactor K1 and a contactor K2. One end of the contactor K1 is connected to a first end of the first battery, and two contacts of the contactor K1 are respectively connected to a first direct-current end of the three-phase converter and a first interface of the direct-current charging port. One end of the contactor K2 is connected to a second end of the first battery, two contacts of the contactor K2 are respectively connected to a second direct-current end of the three-phase converter and a second interface of the direct-current charging port. In this implementation, the contactor K1 and the contactor K2 each have three contact states. When both the contactor K1 and the contactor K2 are in a first contact state, the first switch group is closed, and the second switch group is open. When both the contactor K1 and the contactor K2 are in a second contact state, both the first switch group and the second switch group are open. When both the contactor K1 and the contactor K2 are in a third contact state, the second switch group is closed, and the first switch group is open. In this implementation, functions of the first switch group and the second switch group can be implemented by using two triggers, thereby further improving integration of the energy conversion apparatus.

With reference to the first aspect, in an implementation of this embodiment of this application, the first end of the three-port converter is connected to the input end of the first battery through a fourth switch group. In this implementation, the fourth switch group may be configured to control connection/disconnection between the three-port converter and the first battery, so that the solution provided in this embodiment of this application is more comprehensive.

With reference to the first aspect, in an implementation of this embodiment of this application, the fourth switch group is embedded inside the first battery. This implementation makes the solution provided in this embodiment of this application more comprehensive.

With reference to the first aspect, in an implementation of this embodiment of this application, the fourth switch group includes a fifth switch and a sixth switch. The fifth switch and a resistor are connected in series and then are connected in parallel to the sixth switch. The sixth switch is connected in series between the input end of the first battery and the first end of the three-port converter. This implementation makes the solution provided in this embodiment of this application more comprehensive.

With reference to the first aspect, in an implementation of this embodiment of this application, the fifth switch and the sixth switch are specifically relays. This implementation makes the solution provided in this embodiment of this application more comprehensive.

With reference to the first aspect, in an implementation of this embodiment of this application, the first switch group is embedded inside the first battery. This implementation makes the solution provided in this embodiment of this application more comprehensive.

With reference to the first aspect, in an implementation of this embodiment of this application, the bridge arm circuit includes two capacitors connected in series or two diodes connected in series or two switch tubes connected in series. This implementation makes the solution provided in this embodiment of this application more comprehensive.

With reference to the first aspect, in an implementation of this embodiment of this application, the three-port converter includes a first converter, a second converter, a third converter, and a transformer. One end of the first converter is connected to the first end of the three-port converter, and the other end of the first converter is connected to a first winding of the transformer. One end of the second converter is connected to the second end of the three-port converter, and the other end of the second converter is connected to a second winding of the transformer. One end of the third converter is connected to the third end of the three-port converter, and the other end of the third converter is connected to a third winding of the transformer. This implementation makes the solution provided in this embodiment of this application more comprehensive.

According to a second aspect, an embodiment of this application provides a power system, including a motor and the energy conversion apparatus according to the first aspect. A motor coil of the energy conversion apparatus is configured to drive the motor.

With reference to the second aspect, in an implementation of this embodiment of this application, the power system further includes a reducer. The reducer is connected to the motor to control a rotational speed of the motor. This implementation makes the solution provided in this embodiment of this application more comprehensive.

According to a third aspect, an embodiment of this application provides a vehicle, including the energy conversion apparatus according to the first aspect or the power system according to the second aspect.

DESCRIPTION OF EMBODIMENTS

Embodiments of this application provide an energy conversion apparatus, a power system, and a vehicle. The apparatus is integrated with a charging function and a motor driving function, and can be installed on an electric vehicle to improve vehicle integration, thereby simplifying a structural layout of the electric vehicle, and reducing costs and a volume of the electric vehicle.

In this application, terms such as "first", "second", "third", and "fourth" (if exists) in the specification, the claims, and the accompanying drawings are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

In addition, in embodiments of this application, the word "example" or "for example" is used to represent giving an example, an illustration, or a description. Any embodiment or design scheme described as "in an example" or "for example" in embodiments of this application should not be explained as being more preferred or having more advantages than another embodiment or design scheme. Exactly, use of the word "example" or "for example" or the like is intended to present a relative concept in a specific manner.

For clear and concise description of the following embodiments, brief description of related technologies are first provided.

Generally, there are two solutions for integrating the charging function and the motor driving function of the electric vehicle. One solution is a non-isolated integrated charging solution, and non-isolated charging means that there is no transformer between a charging port and a high-voltage battery for isolation. In other words, the high-voltage battery and the charging port are directly electrically connected in this charging solution, and there are particular safety risks. Currently, the non-isolated charging solution is basically not used in electric vehicles.

The other solution is an isolated integrated charging solution: At least one transformer exists in a transformer circuit between a charging port and a high-voltage battery for isolation. After input from an alternating-current port, rectification and then voltage boosting are performed. Then, a secondary transformer performs isolated transformation to charge the high-voltage battery. The isolated charging solution, regardless of whether it is a single charging solution or an integrated charging solution, is a main form of electric vehicle charging.

With the development of electric vehicle technologies, a requirement on long endurance is increasingly high. Therefore, a higher requirement on a battery capacity is put forward, and a battery voltage is also increasingly high. Therefore, more electric vehicles use high-voltage batteries to provide energy for running of vehicles. In addition, an electric vehicle is equipped with a low-voltage battery to power an electronic device in the vehicle. Considering the high-voltage battery and the low-voltage battery in the electric vehicle, embodiments of this application provide an energy conversion apparatus, a power system, and a vehicle, to integrate a charging function and a motor driving function of the electric vehicle, thereby improving vehicle integration, simplifying a structural layout of the electric vehicle, and reducing costs and a volume of the electric vehicle.

Figure 1:
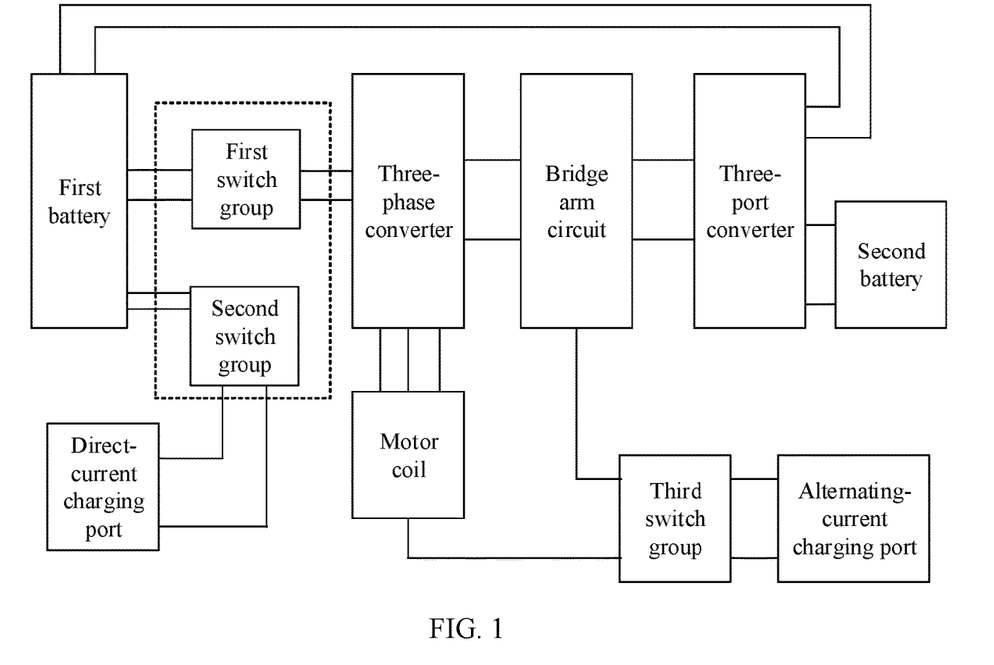
FIG. 1 is a schematic diagram of an energy conversion apparatus according to an embodiment of this application.

FIG. 1 is a schematic diagram of an energy conversion apparatus according to an embodiment of this application. The energy conversion apparatus is integrated with a charging function and a motor driving function. The energy conversion apparatus includes a first switch group, a second switch group, a third switch group, a three-phase converter, a motor coil, a bridge arm circuit, and a three-port converter. Each component of the energy conversion apparatus is described below in detail.

1. First Battery and Second Battery

In this embodiment of this application, the first battery may be a high-voltage battery, and the second battery may be a low-voltage battery. The high-voltage battery is usually configured to provide electrical energy to drive a motor, and the low-voltage battery is usually configured to provide electrical energy for an electronic device in a vehicle. An output voltage of the high-voltage battery may usually reach several hundred volts, and an output voltage of the low-voltage battery is usually 12 V.

An output end of the first battery is connected to the three-phase converter through the first switch group. When the energy conversion apparatus switches to a motor driving mode, the first switch group is closed, and electrical energy output by the first battery is transmitted to the motor coil through the three-phase converter to drive the motor.

An input end of the first battery is connected to a first end of the three-port converter. When the energy conversion apparatus switches to an alternating-current charging mode, the third switch group is closed, and electrical energy input from an alternating-current charging port reaches the first battery through the third switch group, the reused motor coil, the three-phase converter, the bridge arm circuit, and the three-port converter, to charge the first battery. It can be understood that the electrical energy input from the alternating-current charging port may also be used to charge the second battery through the third switch group, the reused motor coil, the three-phase converter, the bridge arm circuit, and the three-port converter.

The input end of the first battery may be also connected to a direct-current charging port through the second switch group. When the energy conversion apparatus switches to a direct-current charging mode, the second switch group is closed, and electrical energy input from the direct-current charging port may reach the first battery through the second switch group, to charge the first battery.

Therefore, the energy conversion apparatus in this embodiment of this application has three working modes in total: the motor driving mode, the alternating-current charging mode, and the direct-current charging mode. To prevent a conflict between the modes, the switch groups may be closed or open according to an example in Table 1.

TABLE 1

| First switch group | Second switch group | Third switch group | Working mode |
|---|---|---|---|
| Open | Open | Closed | Alternating-current charging mode |
| Closed | Open | Open | Motor driving mode |
| Open | Closed | Open | Direct-current charging mode |

It can be learned from the foregoing description that the energy conversion apparatus provided in this embodiment of this application can implement three modes by using a simple circuit structure, and the charging function and the motor driving function of the electric vehicle are integrated, thereby improving vehicle integration, simplifying a structural layout of the electric vehicle, and reducing costs and a volume of the electric vehicle.

In some embodiments, in the alternating-current charging mode, the energy conversion apparatus also supports inverse conversion of energy of the first battery into alternating-current, to supply power to another device by using the alternating-current charging port.

2. Three-Phase Converter, Motor Coil, and Bridge Arm Circuit

In this embodiment of this application, when the energy conversion apparatus is in the motor driving mode, a function of the three-phase converter is to convert the high-voltage direct current of the first battery into three-phase alternating-current, and output the three-phase alternating-current to the motor coil, so as to drive the motor. In this embodiment of this application, the motor may be a motor that drives a vehicle to travel, or may be a motor used for an air conditioner compressor in an electric vehicle, or another similar motor in an electric vehicle. A specific function of the motor is not limited in this embodiment of this application.

When the energy conversion apparatus is in the alternating-current charging mode, the three-phase converter and the bridge arm circuit cooperate to serve as a rectifier (AC/DC converter) to convert an alternating-current input from the alternating-current charging port into a direct current (generally, rectification and voltage boosting are performed). Then, the direct current may be transmitted to the first battery through the three-port converter, to charge the first battery.

Figure 2A:
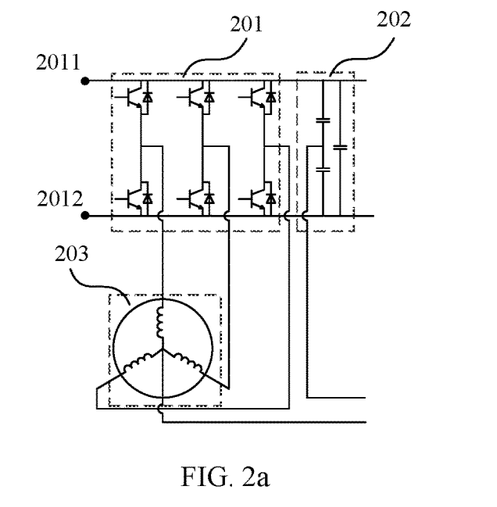
FIG. 2a is a schematic diagram of a first one of three implementations of a three-phase converter, a motor coil, and a bridge arm circuit according to an embodiment of this application.
Figure 2B:
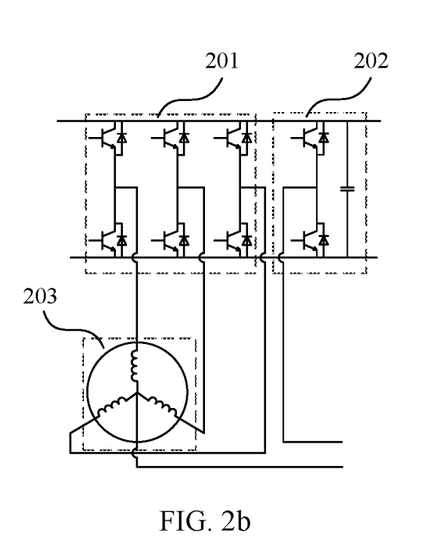
FIG. 2b is a schematic diagram of a second one of three implementations of a three-phase converter, a motor coil, and a bridge arm circuit according to an embodiment of this application.
Figure 2C:
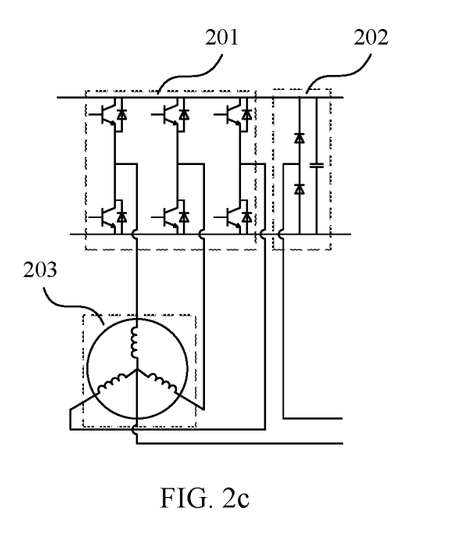
FIG. 2c is a schematic diagram of a third one of implementations of a three-phase converter, a motor coil, and a bridge arm circuit according to an embodiment of this application.

To implement the foregoing functions, the three-phase converter may be a three-phase three-bridge-arm converter, or may be a three-phase four-bridge-arm converter. This is not limited in this embodiment of this application. The bridge arm circuit may be two capacitors connected in series or two diodes connected in series or two switch tubes connected in series. Two direct-current terminals of the bridge arm circuit can be further connected in parallel to a capacitor. Refer to FIG. 2a, FIG. 2b, and FIG. 2c. FIG. 2a, FIG. 2b, and FIG. 2c show three implementations of a three-phase converter, a motor coil, and a bridge arm circuit according to an embodiment of this application are shown.

As shown in FIG. 2a, three alternating-current ends of a three-phase converter 201 are respectively connected to three windings of a motor coil 203. A bus end of the three windings of the motor coil 203 is connected to an alternating-current charging port through a third switch group. A bridge arm circuit 202 includes two capacitors connected in series, and the two capacitors connected in series are connected in parallel to another capacitor. An alternating-current end of the bridge arm circuit 202 is connected between the two capacitors connected in series, and is connected to the alternating-current charging port through the third switch group. Both ends of the two capacitors connected in series are direct-current ends of the bridge arm circuit 202, and are connected to direct-current ends of the three-phase converter 201. The direct-current end of the three-phase converter 201 includes a first direct-current end 2011 and a second direct-current end 2012.

As shown in FIG. 2b, three alternating-current ends of a three-phase converter 201 are respectively connected to three windings of a motor coil 203. A bus end of the three windings of the motor coil 203 is connected to an alternating-current charging port through a third switch group. A bridge arm circuit 202 includes two switch tubes connected in series, and the two switch tubes connected in series are connected in parallel to another switch tube. An alternating-current end of the bridge arm circuit 202 is connected between the two switch tubes connected in series, and is connected to the alternating-current charging port through the third switch group. Both ends of the two switch tubes connected in series are direct-current ends of the bridge arm circuit 202, and are connected to direct-current ends of the three-phase converter 201.

As shown in FIG. 2c, three alternating-current ends of a three-phase converter 201 are respectively connected to three windings of a motor coil 203. A bus end of the three windings of the motor coil 203 is connected to an alternating-current charging port through a third switch group. A bridge arm circuit 202 includes two diodes connected in series, and the two diodes connected in series are connected in parallel to another diode. An alternating-current end of the bridge arm circuit 202 is connected between the two diodes connected in series, and is connected to the alternating-current charging port through the third switch group. Both ends of the two diodes connected in series are direct-current ends of the bridge arm circuit 202, and are connected to direct-current ends of the three-phase converter 201.

3. Three-Port Converter

As shown in FIG. 1, in this embodiment of this application, the first end of the three-port converter is connected to the input end of the first battery, a second end of the three-port converter is connected to a direct-current end of the bridge arm circuit, and a third end of the three-port converter is connected to the second battery.

Figure 3:
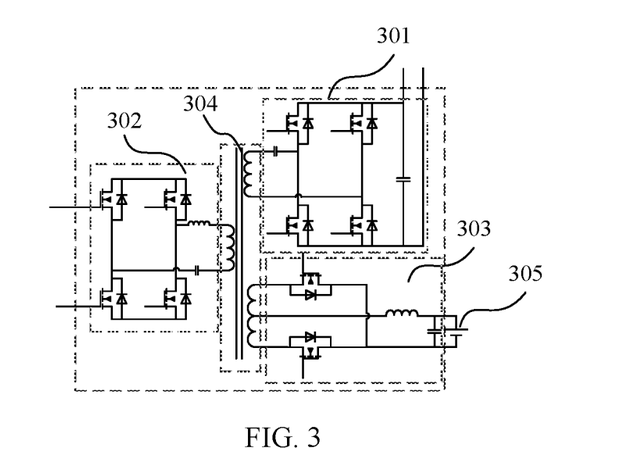
FIG. 3 is a schematic diagram of a magnetically integrated three-port converter according to an embodiment of this application.

Specifically, the three-port converter may be a common three-port direct-current converter, or may be a magnetically integrated three-port converter shown in FIG. 3 provided in this embodiment of this application.

As shown in FIG. 3, the three-port converter includes a first converter 301, a second converter 302, a third converter 303, and a transformer 304. One end of the first converter 301 is connected to the first end of the three-port converter, and the other end of the first converter 301 is connected to a first winding of the transformer 304. One end of the second converter 302 is connected to the second end of the three-port converter, and the other end of the second converter 302 is connected to a second winding of the transformer 304. One end of the third converter 303 is connected to the third end of the three-port converter, and the other end of the third converter 303 is connected to a third winding of the transformer 304. In addition, the third end of the three-port converter is connected to a second battery 305.

In this embodiment of this application, the first converter 301 is configured to convert a direct current at the first end of the three-port converter into an alternating current, and transmit the alternating current to the first winding of the transformer 304, and the transformer 304 transforms the alternating current and transmits a transformed alternating current to another converter inside the three-port converter. Alternatively, the first converter 301 converts alternating-current electrical energy from another converter inside the three-port converter into direct-current electrical energy and transmits the direct-current electrical energy through the first end of the three-port converter.

Similarly, the second converter 302 is configured to convert a direct current at the second end of the three-port converter into an alternating current, and transmit the alternating current to the second winding of the transformer 304, and the transformer 304 transforms the alternating current and transmits a transformed alternating current to another converter inside the three-port converter. Alternatively, the second converter 302 converts alternating-current electrical energy from another converter inside the three-port converter into direct-current electrical energy and transmits the direct-current electrical energy through the second end of the three-port converter.

Similarly, the third converter 303 is configured to convert a direct current at the third end of the three-port converter into an alternating current, and transmit the alternating current to the second winding of the transformer 304, and the transformer 304 transforms the alternating current and transmits a transformed alternating current to another converter inside the three-port converter. Alternatively, the third converter 303 converts alternating-current electrical energy from another converter inside the three-port converter into direct-current electrical energy and transmits the direct-current electrical energy to the second battery 305 through the second end of the three-port converter.

It can be understood that the three windings of the transformer 304 may respectively have different turns, to match voltage magnifications of the first end, the second end, and the third end of the three-port converter.

4. First Switch Group, Second Switch Group, and Third Switch Group

Figure 4:
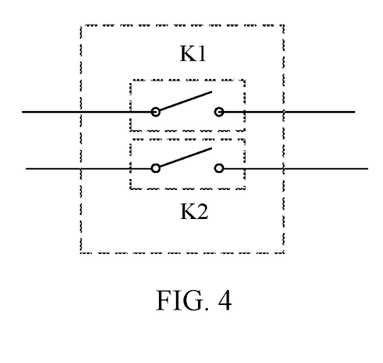
FIG. 4 is a schematic diagram of a switch group according to an embodiment of this application.

In this embodiment of this application, a switch group (including the first switch group, the second switch group, and the third switch group) may include a plurality of switches, to simultaneously control closure/opening of a plurality of ports. For example, FIG. 4 is a schematic diagram of a switch group according to an embodiment of this application. As shown in FIG. 4, the switch group may include a switch K1 and a switch K2, which respectively control connection/disconnection of two lines.

Figure 5A:
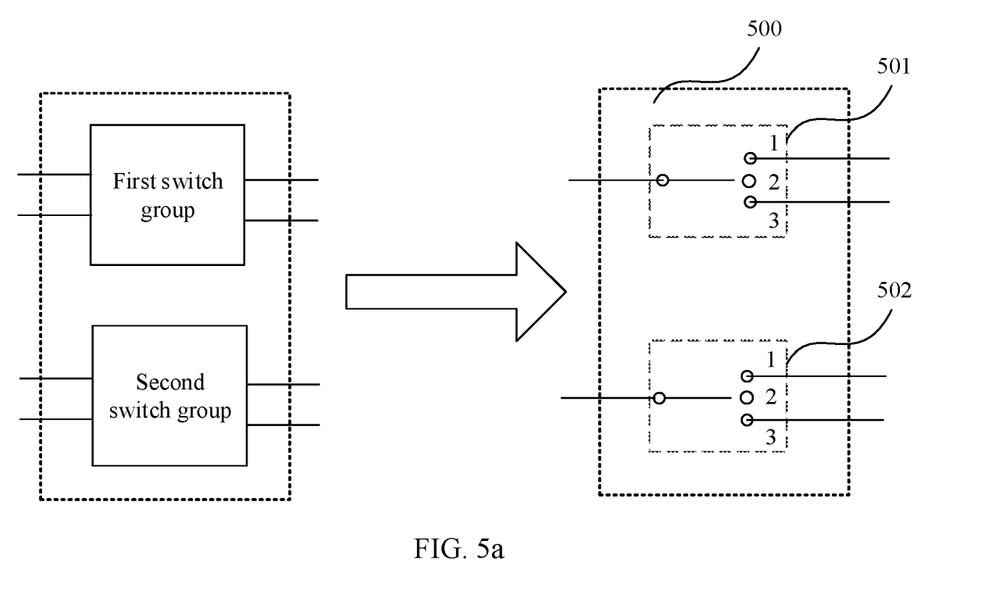
FIG. 5a is a schematic diagram of a trigger combination according to an embodiment of this application.

In this embodiment of this application, a plurality of switch groups may be integrated into two triggers. As shown in FIG. 5a, a trigger combination 500 includes a trigger 501 and a trigger 502. One end (namely, a left port) of the trigger 501 is connected to the first end of the first battery, a contact 1 of the trigger 501 is connected to a first direct-current end of the three-phase converter, a contact 2 is not connected to another device, and a contact 3 is connected to a first interface of the direct-current charging port. One end (namely, a left port) of the trigger 502 is connected to a second end of the first battery, a contact 1 of the trigger 501 is connected to a second direct-current end of the three-phase converter, a contact 2 is not connected to another device, and a contact 3 is connected to a second interface of the direct-current charging port. It can be understood that the first end and the second end of the first battery may be positive and negative electrode connection ends of the first battery, and the first end and the second end of the first battery can implement an input/output function (which may be controlled by a battery control chip). The first direct-current end and the second direct-current end of the three-phase converter may be the first direct-current end 2011 and the second direct-current end 2012 shown in FIG. 2a.

Figure 5B:
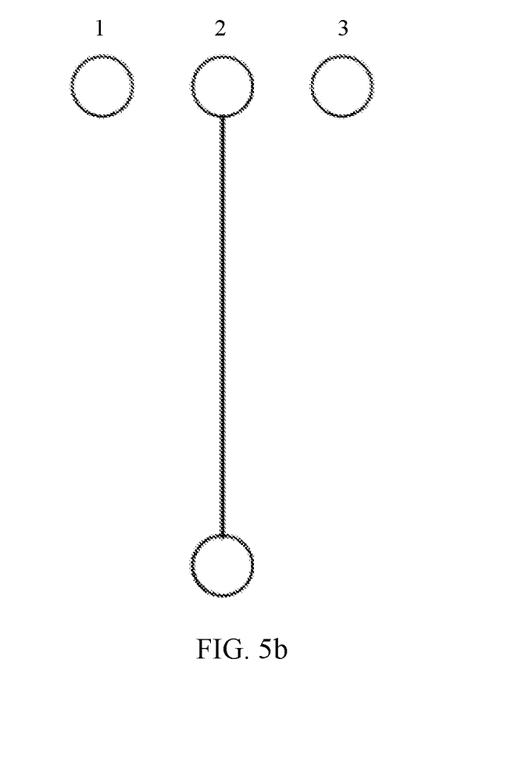
FIG. 5b is a schematic diagram of an internal structure of a single trigger according to an embodiment of this application.

FIG. 5b is a schematic diagram of an internal structure of a single trigger. One end of the trigger may be connected to a device, and the other end may be connected to different devices through three contacts, or may not be connected to any device. When the trigger is in different contact states, different connections can be achieved.

Therefore, in the trigger combination 500 shown in FIG. 5a, when the trigger 501 and the trigger 502 are both in a first contact state (that is, the trigger 501 and the trigger 502 are connected to their respective contacts 1), the first battery may be connected to the three-phase converter through the trigger combination 500, which is equivalent to that the first switch group is closed and the second switch group is open. When the trigger 501 and the trigger 502 are both in a second contact state (that is, the trigger 501 and the trigger 502 are connected to the contacts 2), the first battery is not connected to any device through the trigger combination 500, which is equivalent to that both the first switch group and the second switch group are open. When the trigger 501 and the trigger 502 are both in a third contact state (that is, the trigger 501 and the trigger 502 are connected to the contact 3), the first battery may be connected to the direct-current charging port through the trigger combination 500, which is equivalent to that the first switch group is open and the second switch group is closed.

In this embodiment of this application, the trigger 501 and the trigger 502 may be high-current contactors, to bear a high current of the direct-current charging port.

In some embodiments, the energy conversion apparatus shown in FIG. 1 may be further provided with a fourth switch group between the first battery and the three-port converter. To be specific, the fourth switch group is connected in series between the input end of the first battery and the first end of the three-port converter, as shown in FIG. 6.

Figure 6:
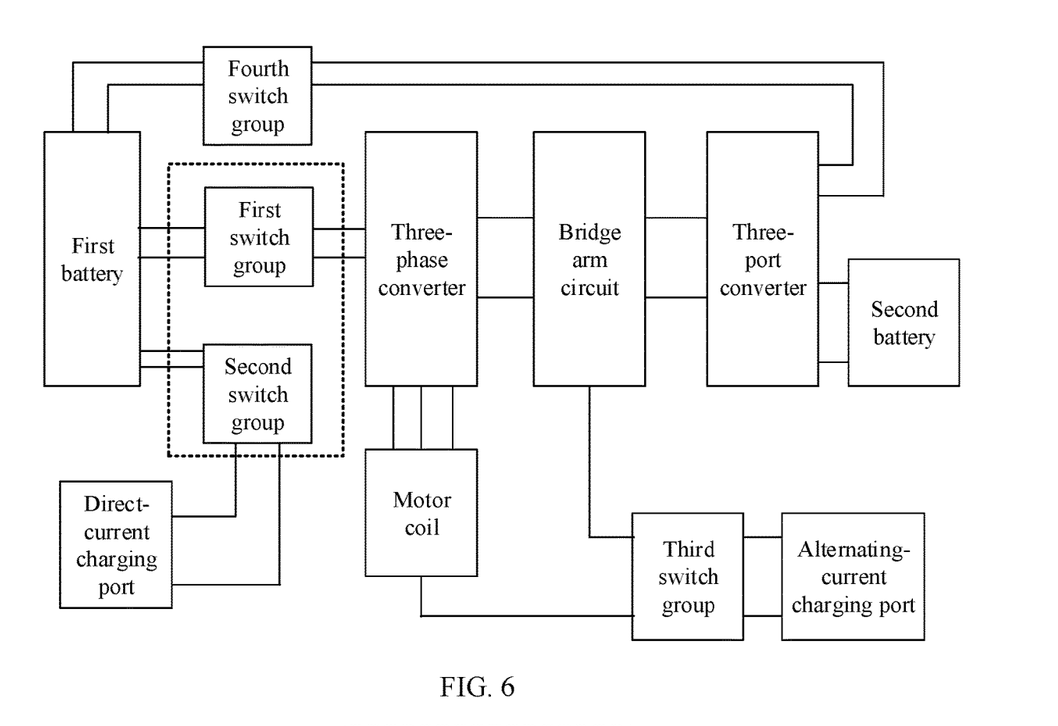
FIG. 6 is a schematic diagram of another energy conversion apparatus according to an embodiment of this application.

In an embodiment shown in FIG. 6, when the fourth switch group is closed, electrical energy of the first battery may also reach the second battery through the fourth switch group and the three-port converter, to charge the second battery, thereby implementing alternating-current charging. When the fourth switch group is open, the first battery is disconnected from the three-port converter.

In the embodiment shown in FIG. 6, in the motor driving mode and the direct-current charging mode of the energy conversion apparatus, the fourth switch group may be either closed or open. When the fourth switch group is closed, electrical energy of the first battery may reach the second battery through the fourth switch group and the three-port converter, to charge the second battery. If the fourth switch group is open, the first battery cannot charge the second battery.

Figure 7:
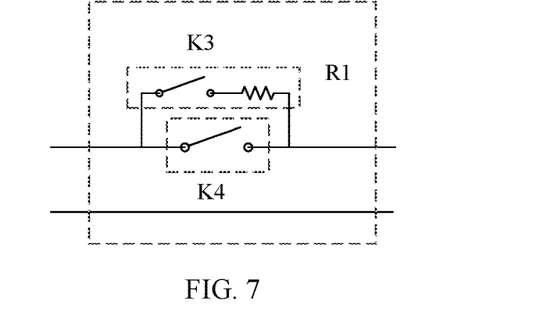
FIG. 7 is a schematic diagram of a fourth switch according to an embodiment of this application.

In the embodiment shown in FIG. 6, the fourth switch group may include a switch K3, a resistor R1, and a switch K4, as shown in FIG. 7. The switch K3 and the resistor R1 are connected in series, and then connected in parallel to a same line as the switch K4, to control connection/disconnection of the line. In this case, the other line in the switch group may not need to be controlled by a switch.

In the foregoing embodiment, in some cases, the trigger may be replaced with a relay or another switch. This is not limited in this embodiment of this application.

According to the foregoing embodiment, this application further provides the following application scenarios.

Figure 8:
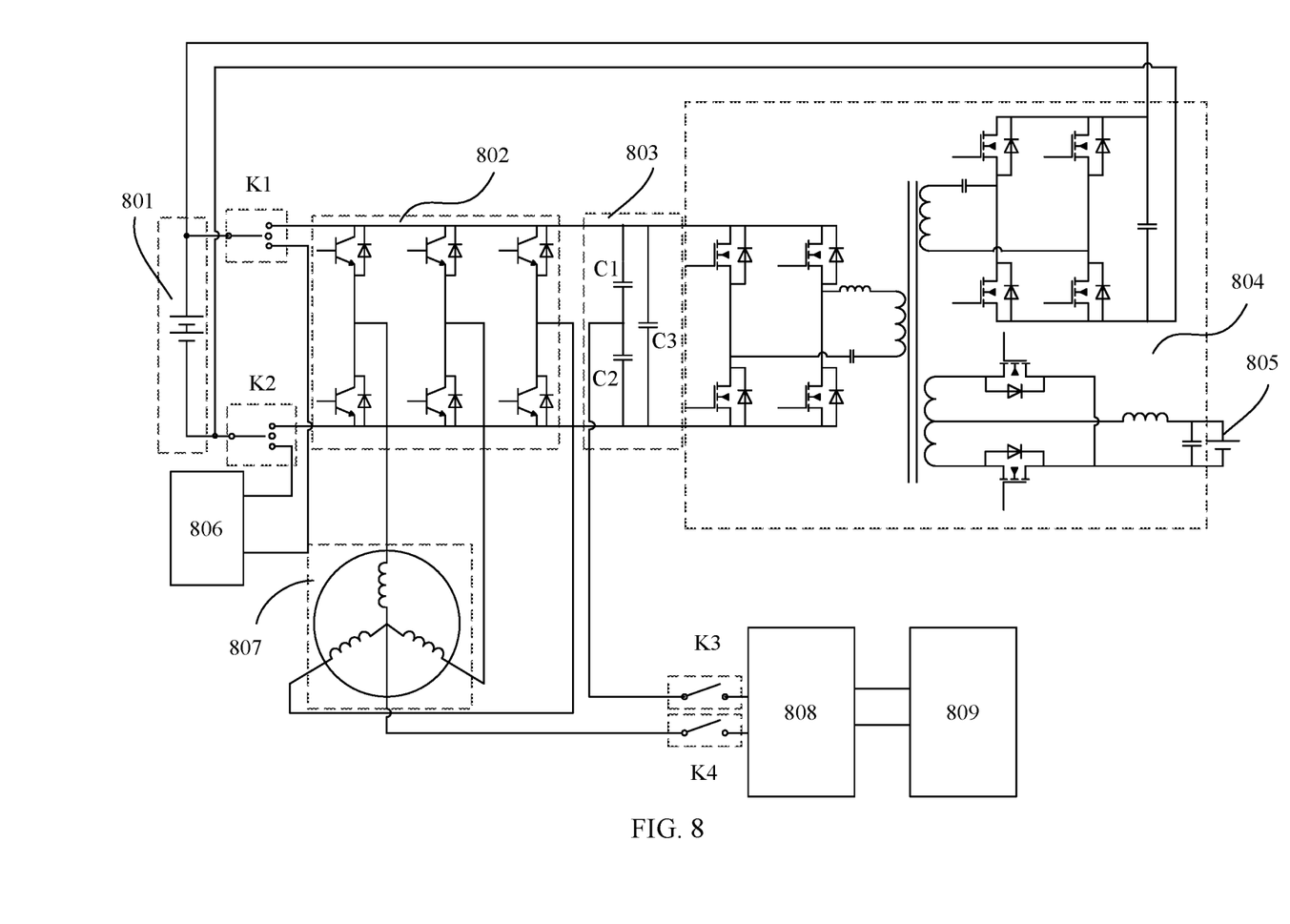
FIG. 8 is a schematic diagram of a first application example according to an embodiment of this application.

FIG. 8 is a schematic diagram of a first application example according to an embodiment of this application. As shown in FIG. 8, the application example includes a high-voltage battery 801, a three-phase bridge converter 802, a direct-current bus capacitor 803, a magnetically integrated three-port converter 804, a low-voltage battery 805, a direct-current fast charging port 806, a motor coil 807, an alternating-current filter 808, an alternating-current charging port 809, a trigger K1, a trigger K2, a trigger K3, and a trigger K4.

In this application example, the high-voltage battery 801 is similar to the first battery in embodiments corresponding to FIG. 1, and details are not described herein again. The three-phase bridge converter 802 is similar to one implementation (the implementation corresponding to FIG. 2a) of the three-phase converter in embodiments corresponding to FIG. 1, and details are not described herein again. The direct-current bus capacitor 803 is similar to one implementation of the bridge arm circuit in embodiments corresponding to FIG. 1, namely, the implementation corresponding to FIG. 2c. Details are not described herein again in this application. The magnetically integrated three-port converter 804 is similar to one implementation (the implementation corresponding to FIG. 3) of the three-port converter in embodiments corresponding to FIG. 1, and details are not described herein again. The low-voltage battery 805 is similar to the second battery in embodiments corresponding to FIG. 1, and details are not described herein again. The direct-current fast charging port 806 is similar to the direct-current charging port in embodiments corresponding to FIG. 1, and details are not described herein again. The motor coil 807 is similar to the motor coil in embodiments corresponding to FIG. 1, and details are not described herein again. The alternating-current charging port 809 is similar to the alternating-current charging port in embodiments corresponding to FIG. 1, and details are not described herein again.

The alternating-current filter 808 is configured to perform filtering processing on an alternating-current input from the alternating-current charging port 809. The alternating-current filter 808 is similar to a conventional alternating-current filter device, and details are not described herein.

The trigger K1 and the trigger K2 form a switch combination of the first switch group and the second switch group, which are specifically similar to the trigger combination 500 shown in FIG. 5a. The trigger K1 is similar to the trigger 501 shown in FIG. 5a, and the trigger K2 is similar to the trigger 502 shown in FIG. 5a. Details are not described herein again.

A switch group formed by the trigger K3 and the trigger K4 is similar to the switch group corresponding to FIG. 4, and details are not described herein again.

In this application example, because of integration with a direct-current fast charging function, the trigger K1 and the trigger K2 may be high-current contactors. This solution is more suitable for integration of a charger and a controller that drives the motor to travel.

Figure 9:
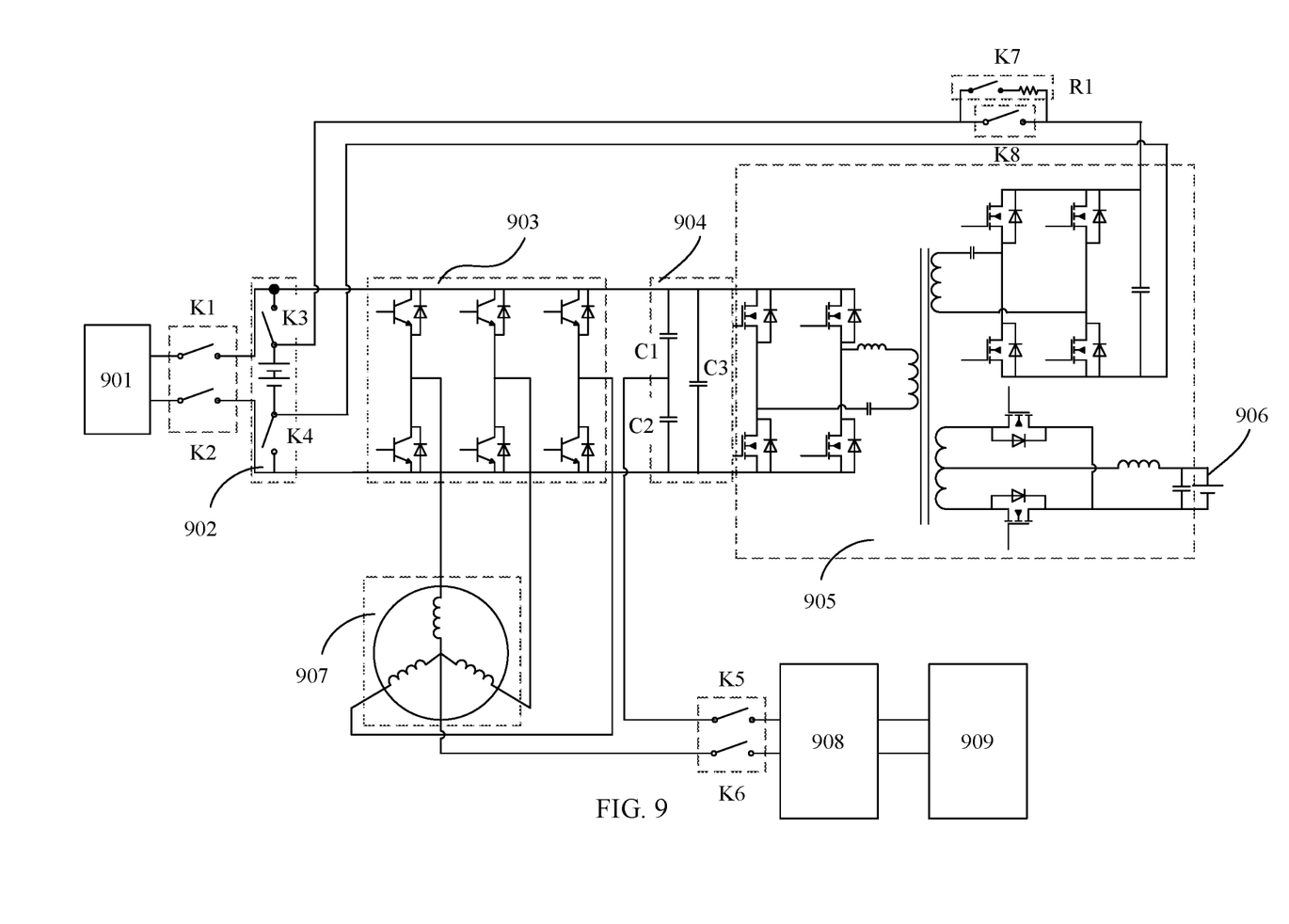
FIG. 9 is a schematic diagram of a second application example according to an embodiment of this application.

FIG. 9 is a schematic diagram of a second application example according to an embodiment of this application. As shown in FIG. 9, the application example includes a direct-current fast charging port 901, a high-voltage battery 902, a three-phase bridge converter 903, a direct-current bus capacitor 904, a magnetically integrated three-port converter 905, a low-voltage battery 906, a motor coil 907, an alternating-current filter 908, an alternating-current charging port 909, a trigger K1, a trigger K2, a trigger K3, a trigger K4, a trigger K5, a trigger K6, a trigger K7, a trigger k8, and a resistor R1.

In this application example, the high-voltage battery 902 is similar to the first battery in embodiments corresponding to FIG. 1, and details are not described herein again. The three-phase bridge converter 903 is similar to one implementation (the implementation corresponding to FIG. 2*a*) of the three-phase converter in embodiments corresponding to FIG. 1, and details are not described herein again. The direct-current bus capacitor 904 is similar to one implementation of the bridge arm circuit in embodiments corresponding to FIG. 1, namely, the implementation corresponding to FIG. 2*c*. Details are not described herein again in this application. The magnetically integrated three-port converter 905 is similar to one implementation (the implementation corresponding to FIG. 3) of the three-port converter in embodiments corresponding to FIG. 1, and details are not described herein again. The low-voltage battery 906 is similar to the second battery in embodiments corresponding to FIG. 1, and details are not described herein again. The direct-current fast charging port 901 is similar to the direct-current charging port in embodiments corresponding to FIG. 1, and details are not described herein again. The motor coil 907 is similar to the motor coil in embodiments corresponding to FIG. 1, and details are not described herein again. The alternating-current filter 908 is similar to the alternating-current filter 808 in the application example corresponding to FIG. 8, and details are not described herein again. The alternating-current charging port 909 is similar to the alternating-current charging port in embodiments corresponding to FIG. 1, and details are not described herein again.

The trigger K3 and the trigger K4 form a switch group similar to the switch group shown in FIG. 4, and similar to the first switch group in embodiments corresponding to FIG. 1, are configured to control connection/disconnection between the high-voltage battery 902 and the three-phase bridge-arm converter 903. In this application example, the trigger K3 and the trigger K4 may be switches embedded inside the high-voltage battery 902 (equivalent to that the first switch group is embedded inside the first battery in FIG. 1).

The trigger K1 and the trigger K2 form a switch group similar to the switch group shown in FIG. 4, and are configured to control connection/disconnection between the direct-current fast charging port 901 and the high-voltage battery 902 when both the trigger K3 and the trigger K4 are closed.

The trigger K5 and the trigger K6 form a switch group similar to the switch group shown in FIG. 4, and similar to the third switch group in embodiments corresponding to FIG. 1, are configured to control access of the alternating-current charging port 909.

The relay K7, the relay K8, and the resistor R1 form a switch group similar to the switch group shown in FIG. 7, and are configured to control connection/disconnection between the high-voltage battery 902 and the magnetically integrated three-port converter 905.

In this application example, the trigger K3 and the trigger K4 may be embedded inside the high-voltage battery 902, so that two wiring terminals are provided at the high-voltage battery 902, to connect a high-voltage output end of the magnetically integrated three-port converter 905 and the high-voltage battery 902. In addition, only low-current relays (the relay K7, the relay K8, and the resistor R1) are added to control connection/disconnection of the trigger K3, the trigger K4, the relay 7, and the relay 8, so as to implement three functions: alternating-current charging, direct-current charging, and motor driving. The motor herein may be a motor that drives a vehicle to travel, a motor used for an air conditioner compressor in an electric vehicle, or another similar motor in an electric vehicle.

Figure 10:
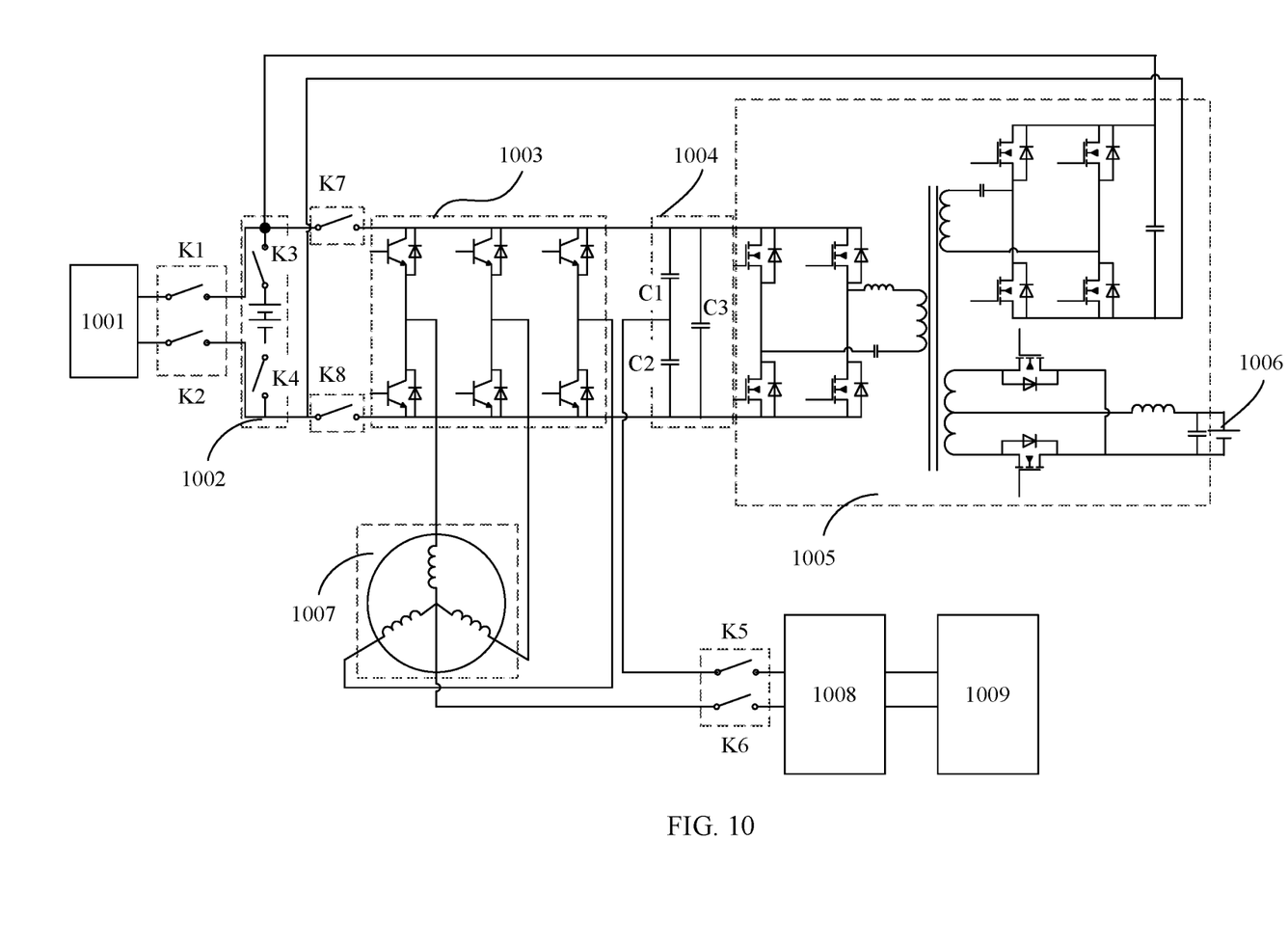
FIG. 10 is a schematic diagram of a third application example according to an embodiment of this application.

FIG. 10 is a schematic diagram of a third application example according to an embodiment of this application. The application example includes a direct-current fast charging port 1001, a high-voltage battery 1002, a three-phase bridge converter 1003, a direct-current bus capacitor 1004, a magnetically integrated three-port converter 1005, a low-voltage battery 1006, a motor coil 1007, an alternating-current filter 1008, an alternating-current charging port 1009, a trigger K1, a trigger K2, a trigger K3, a trigger K4, a trigger K5, a trigger K6, a trigger K7, and a trigger k8.

In this application example, the high-voltage battery 1002 is similar to the first battery in embodiments corresponding to FIG. 1, and details are not described herein again. The three-phase bridge converter 1003 is similar to one implementation (the implementation corresponding to FIG. 2*a*) of the three-phase converter in embodiments corresponding to FIG. 1, and details are not described herein again. The direct-current bus capacitor 1004 is similar to one implementation of the bridge arm circuit in embodiments corresponding to FIG. 1, namely, the implementation corresponding to FIG. 2*c*. Details are not described herein again in this application. The magnetically integrated three-port converter 1005 is similar to one implementation (the implementation corresponding to FIG. 3) of the three-port converter in embodiments corresponding to FIG. 1, and details are not described herein again. The low-voltage battery 1006 is similar to the second battery in embodiments corresponding to FIG. 1, and details are not described herein again. The direct-current fast charging port 1007 is similar to the direct-current charging port in embodiments corresponding to FIG. 1, and details are not described herein again. The motor coil 1007 is similar to the motor coil in embodiments corresponding to FIG. 1, and details are not described herein again. The alternating-current filter 1008 is similar to the alternating-current filter 808 in the application example corresponding to FIG. 8, and details are not described herein again. The alternating-current charging port 1009 is similar to the alternating-current charging port in embodiments corresponding to FIG. 1, and details are not described herein again.

The trigger K3 and the trigger K4 form a switch group similar to the switch group shown in FIG. 4, and similar to the fourth switch group in embodiments corresponding to FIG. 6, are configured to control connection/disconnection between the high-voltage battery 1002 and the magnetically integrated three-port converter 1005. In this application example, the trigger K3 and the trigger K4 may be switches embedded inside the high-voltage battery 1002 (equivalent to that the fourth switch group is embedded inside the first battery in FIG. 6).

The trigger K1 and the trigger K2 form a switch group similar to the switch group shown in FIG. 4, and are configured to control connection/disconnection between the direct-current fast charging port 1001 and the high-voltage battery 1002 when both the trigger K3 and the trigger K4 are closed.

The trigger K5 and the trigger K6 form a switch group similar to the switch group shown in FIG. 4, and similar to the third switch group in embodiments corresponding to FIG. 1, are configured to control access of the alternating-current charging port 1009.

The relay K7 and the relay K8 form a switch group similar to the switch group shown in FIG. 4, and similar to the first switch group in embodiments corresponding to FIG. 6, are configured to control connection/disconnection between the high-voltage battery 1002 and the three-phase bridge converter 1003.

In this application example, the relay K7 and the relay K8 are added. Usually, power for alternating-current charging is smaller than power of a motor for driving a vehicle, and power of an air conditioner compressor in an electric vehicle is comparable to power of an alternating-current charger. Therefore, the alternating-current charging and control on the air conditioner compressor are integrated, so that the relay K7 and the relay K8 may use low-current relays, to achieve a better benefit.

Figure 11:
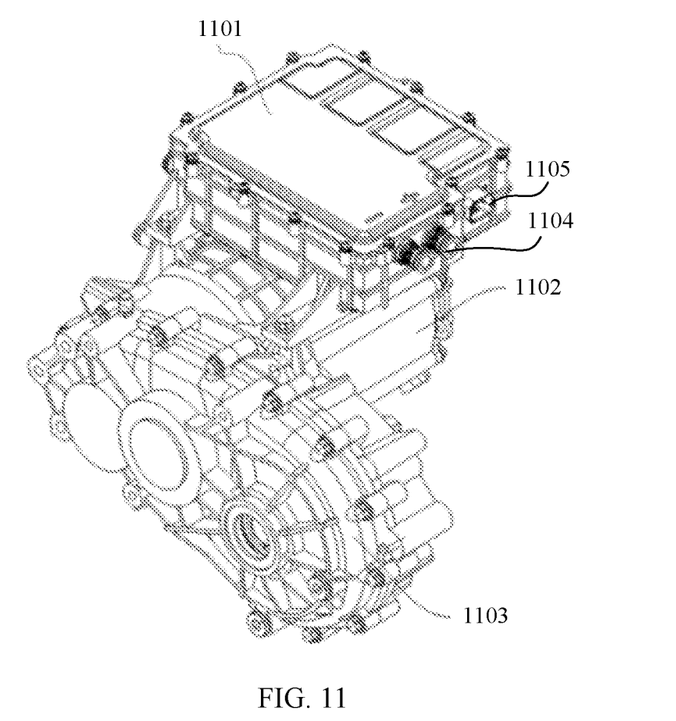
FIG. 11 is a schematic diagram of a power system according to an embodiment of this application.

FIG. 11 is a schematic diagram of a power system according to an embodiment of this application. The power system includes an energy conversion apparatus 1101, a motor 1102, and a reducer 1103.

An internal circuit of the energy conversion apparatus 1101 is similar to the energy conversion apparatus provided in embodiments corresponding to FIG. 1, and details are not described herein again. It can be understood that a motor coil in the energy conversion apparatus 1101 is also a motor coil of the motor 1102.

A housing of the energy conversion apparatus 1101 is shown in FIG. 11, and a direct-current charging port 1104 and an alternating-current charging port 1105 are disposed on the housing. Two symbols "+" and "−" are further marked next to the direct-current charging port 1104 to indicate positive and negative electrode interfaces of the direct-current charging port. Connections of the internal circuit of the energy conversion apparatus 1101 to the direct-current charging port 1104 to are similar to those connections to the direct-current charging port in embodiments corresponding to FIG. 1 and FIG. 6 or the direct-current fast charging port in the application examples corresponding to FIG. 8, FIG. 9, and FIG. 10, and details are not described herein again. Connections of the internal circuit of the energy conversion apparatus 1101 to the alternating-current charging port 1105 are similar to those connections to the alternating-current charging port in embodiments corresponding to FIG. 1 and FIG. 6 or the alternating-current charging port in the application examples corresponding to FIG. 8, FIG. 9, and FIG. 10, and details are not described herein again.

In this embodiment of this application, the energy conversion apparatus 1101 may be provided with both the direct-current charging port 1104 and the alternating-current charging port 1105, or may be provided with only the direct-current charging port 1104 or the alternating-current charging port 1105. This is not limited in this embodiment of this application.

As shown in FIG. 11, the reducer 1103 is connected to the motor 1102 to control a rotational speed of the motor 1102. The reducer 1103 is similar to speed reducers of other electric vehicles, and details are not described herein again.

Figure 12:
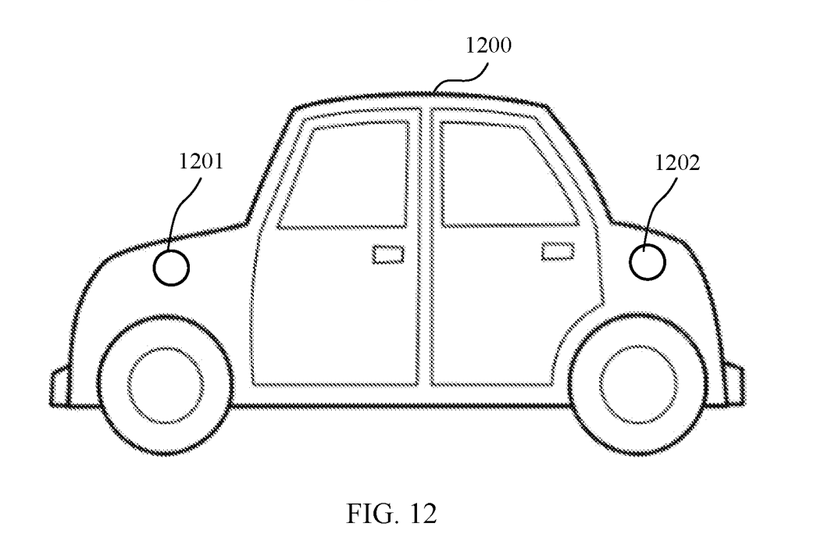
FIG. 12 is a schematic diagram of an electric vehicle according to an embodiment of this application.

FIG. 12 is a schematic diagram of an electric vehicle according to an embodiment of this application. The electric vehicle 1200 includes the power system provided in the embodiment corresponding to FIG. 11 and a vehicle housing. The power system is disposed in the vehicle housing, and a direct-current charging port 1201 and an alternating-current charging port 1202 of the power system are disposed on the vehicle housing. A motor of the power system is connected to wheels of the electric vehicle 1200, and is configured to drive the wheels to rotate, so as to provide power for running of the electric vehicle 1200.

In this embodiment of this application, the direct-current charging port 1201 and the alternating-current charging port 1202 may be disposed on both sides of the front or the back of the vehicle housing, or may be disposed on a same side. Positions of the direct-current charging port 1201 and the alternating-current charging port 1202 are not limited in this embodiment of this application.

In this embodiment of this application, the electric vehicle 1200 may be provided with both the direct-current charging port 1104 and the alternating-current charging port 1105, or may be provided with only the direct-current charging port 1104 or the alternating-current charging port 1105. This is not limited in this embodiment of this application.

In some other embodiments, the electric vehicle 1200 may include the energy conversion apparatus provided in embodiments corresponding to FIG. 1, a motor, a vehicle housing, and the like. The direct-current charging port 1201 and the alternating-current charging port 1202 of the energy conversion apparatus are disposed on the vehicle housing. The motor is connected to wheels of the electric vehicle 1200, and is configured to drive the wheels to rotate, so as to provide power for running of the electric vehicle 1200.

It may be clearly understood by persons skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An energy conversion apparatus comprising:
a first switch group, a second switch group, a third switch group, a three-phase converter, a motor coil, a bridge arm circuit, and a three-port converter, wherein
a direct-current end of the three-phase converter is connected to an output end of a first battery through the first switch group, and is further connected to a direct-current end of the bridge arm circuit;
an alternating-current end of the bridge arm circuit is connected to an alternating-current charging port through the third switch group;
an alternating-current end of the three-phase converter is connected to the motor coil;
a bus end of the motor coil is connected to the alternating-current charging port through the third switch group;
a first end of the three-port converter is connected to an input end of the first battery, a second end of the three-port converter is connected to the direct-current end of the bridge arm circuit, and a third end of the three-port converter is connected to a second battery; and
the input end of the first battery is connected to a direct-current charging port through the second switch group.

2. The energy conversion apparatus according to claim 1, wherein the first switch group and the second switch group comprise a contactor K1 and a contactor K2;
one end of the contactor K1 is connected to a first end of the first battery, two contacts of the contactor K1 are respectively connected to a first direct-current end of the three-phase converter and a first interface of the direct-current charging port; and
one end of the contactor K2 is connected to a second end of the first battery, two contacts of the contactor K2 are respectively connected to a second direct-current end of the three-phase converter and a second interface of the direct-current charging port.

3. The energy conversion apparatus according to claim 1, wherein the first end of the three-port converter is connected to the input end of the first battery through a fourth switch group.

4. The energy conversion apparatus according to claim 3, wherein the fourth switch group is embedded inside the first battery.

5. The energy conversion apparatus according to claim 3, wherein the fourth switch group comprises a fifth switch and a sixth switch;
the fifth switch and a resistor are connected in series and then are connected in parallel to the sixth switch; and
the sixth switch is connected in series between the input end of the first battery and the first end of the three-port converter.

6. The energy conversion apparatus according to claim 5, wherein the fifth switch and the sixth switch are relays.

7. The energy conversion apparatus according to claim 1, wherein the bridge arm circuit comprises two capacitors connected in series or two diodes connected in series or two switch tubes connected in series.

8. The energy conversion apparatus according to claim 1, wherein the three-port converter comprises a first converter, a second converter, a third converter, and a transformer;
one end of the first converter is connected to the first end of the three-port converter, and the other end of the first converter is connected to a first winding of the transformer;
one end of the second converter is connected to the second end of the three-port converter, and the other end of the second converter is connected to a second winding of the transformer; and
one end of the third converter is connected to the third end of the three-port converter, and the other end of the third converter is connected to a third winding of the transformer.

9. A power system comprising:
a motor and an energy conversion apparatus, wherein the energy conversion apparatus comprises a first switch group, a second switch group, a third switch group, a three-phase converter, a motor coil, a bridge arm circuit, and a three-port converter, wherein
a direct-current end of the three-phase converter is connected to an output end of a first battery through the first switch group, and is further connected to a direct-current end of the bridge arm circuit;
an alternating-current end of the three-phase converter is connected to the motor coil;
an alternating-current end of the bridge arm circuit is connected to an alternating-current charging port through the third switch group;
a bus end of the motor coil is connected to the alternating-current charging port through the third switch group;
a first end of the three-port converter is connected to an input end of the first battery, a second end of the three-port converter is connected to the direct-current end of the bridge arm circuit, and a third end of the three-port converter is connected to a second battery;
the input end of the first battery is connected to a direct-current charging port through the second switch group; and
the motor coil is configured to drive the motor.

10. The power system according to claim 9, wherein the first switch group and the second switch group comprise a contactor K1 and a contactor K2;
one end of the contactor K1 is connected to a first end of the first battery, two contacts of the contactor K1 are respectively connected to a first direct-current end of the three-phase converter and a first interface of the direct-current charging port; and
one end of the contactor K2 is connected to a second end of the first battery, two contacts of the contactor K2 are respectively connected to a second direct-current end of the three-phase converter and a second interface of the direct-current charging port.

11. The power system according to claim 9, wherein the first end of the three-port converter is connected to the input end of the first battery through a fourth switch group.

12. The power system according to claim 9, further comprising a reducer, wherein the reducer is connected to the motor to control a rotational speed of the motor.

13. A vehicle, comprising an energy conversion apparatus, wherein the energy conversion apparatus comprises:
a first switch group, a second switch group, a third switch group, a three-phase converter, a motor coil, a bridge arm circuit, and a three-port converter, wherein
a direct-current end of the three-phase converter is connected to an output end of a first battery through the first switch group, and is further connected to a direct-current end of the bridge arm circuit;

an alternating-current end of the three-phase converter is connected to the motor coil;

an alternating-current end of the bridge arm circuit is connected to an alternating-current charging port through the third switch group;

a bus end of the motor coil is connected to the alternating-current charging port through the third switch group;

a first end of the three-port converter is connected to an input end of the first battery, a second end of the three-port converter is connected to the direct-current end of the bridge arm circuit, and a third end of the three-port converter is connected to a second battery;

the input end of the first battery is connected to a direct-current charging port through the second switch group; and the motor coil is configured to drive the motor.

14. The vehicle according to claim 13, wherein the first switch group and the second switch group comprise a contactor K1 and a contactor K2;

one end of the contactor K1 is connected to a first end of the first battery, two contacts of the contactor K1 are respectively connected to a first direct-current end of the three-phase converter and a first interface of the direct-current charging port; and one end of the contactor K2 is connected to a second end of the first battery, two contacts of the contactor K2 are respectively connected to a second direct-current end of the three-phase converter and a second interface of the direct-current charging port.

15. The vehicle according to claim 13, wherein the first end of the three-port converter is connected to the input end of the first battery through a fourth switch group.

* * * * *